V. Duterne,
Piston-Rod Packing.
Nº 50,541.   Patented Oct. 17, 1865.
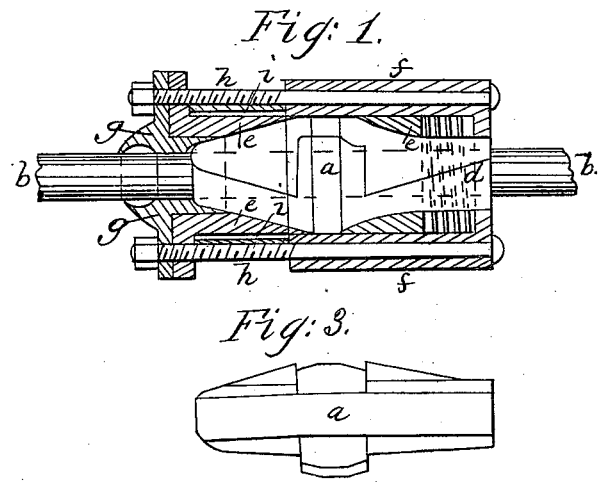
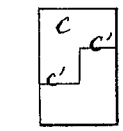
Witnesses.
Inventor.
Victor Duterne
by J. A. Pollok
his atty

UNITED STATES PATENT OFFICE.

VICTOR DUTERNE, OF PARIS, FRANCE.

IMPROVEMENT IN STUFFING-BOXES FOR STEAM-ENGINES.

Specification forming part of Letters Patent No. 50,541, dated October 17, 1865.

*To all whom it may concern:*

Be it known that I, VICTOR DUTERNE, of the city of Paris, in the Empire of France, have invented certain new and useful Improvements in Stuffing-Boxes for Steam and other Engines; and I do hereby declare that the following is a full, clear, and exact description of the construction and operation of the same, reference being had to the accompanying drawings, in which—

Figure 1 represents a longitudinal central section through said stuffing-box. Figs. 2 and 3 represent detached views, hereinafter to be referred to.

To enable others skilled in the art to make and use my invention, I will proceed to describe its construction and operation.

$f$ represents the casing of the stuffing-box, which is secured to or cast in one piece with the steam-cylinder.

$b$ represents the piston-rod, upon which a sleeve, $a$, is set, which is made tapering toward both ends, and whose central cylindrical part fits closely within the casing $f$, while one of its ends is fitted within a corresponding aperture within the casing.

The sleeve $a$ is composed of two halves, which are fitted on the piston-rod and are made of a suitable material to insure an easy and perfect operation of the same. The two halves of the sleeve $a$ are not fitted together in straight joints, but the lines of the joints are curved, and one or more projections of one part enter a suitable recess or recesses of the other, and thus make the sleeve steam-tight and prevent any steam escaping through the joints, as would be the case if the latter were straight.

$c$ represents a collar, which is fitted upon the conical part of the sleeve $a$, and is pressed up against the same by means of the spiral spring $d$, which rests upon the bottom flange of the stuffing-box casing $f$. It holds the two halves of the sleeve $a$ together and presses them against the piston-rod $b$. The collar $c$ itself is made in two pieces, which are fitted together at $c'$, as represented at Fig. 2. The sleeve $a$ is also held in its position by the piece $e$, whose rim is made to correspond to the conical shape of the sleeve $a$. Cap $g$ is fitted upon the flange of the piece $e$, and both are secured to the stuffing-box $f$ by means of the screw-bolts $h$. By operating the nuts of said bolts the piece $e$ is forced against the collar $a$, and the latter against the collar $c$, resulting in a pressure upon the sleeve $a$, which is thus forced against the piston-rod, and its pressure upon the same can be adjusted accurately by means of said screw-nuts.

$o$ represents a small cavity within the cap $g$, into which fibrous material is inserted, which is impregnated with oil for lubricating the piston.

The advantages of this stuffing-box are that all fibrous material, such as hemp, cotton, &c., which were used heretofore for making the piston-rod steam-tight, are dispensed with, whereby the frequent renewal of the packing is avoided. Further, the sleeve $a$ and the collar $c$ present steam-tight packings, not only against the escape of steam from the cylinder, but also against the entrance of air into the cylinder when a vacuum is created therein, as is the case in condensing-engines, the spring $d$ preventing any movement of the collar $c$ in that direction.

Having thus fully described the nature of my invention, what I claim herein as new, and desire to secure by Letters Patent, is—

The combination, with the piston-rod $b$ and stuffing-box $f$, of the conical sleeves $a$ and $c$, spring $d$, piece $e$, and cap $g$, substantially in the manner and for the purposes specified.

VICTOR DUTERNE.

In presence of—
 E. PERILL,
 EDWARD TUCK.